US009699076B2

(12) United States Patent
Renzullo et al.

(10) Patent No.: US 9,699,076 B2
(45) Date of Patent: Jul. 4, 2017

(54) METHODS, SYSTEMS, AND COMPUTER READABLE MEDIA FOR IMPLEMENTING INTELLIGENT POLICY AND CHARGING RULES FUNCTION (PCRF) OVERLOAD CONTROL

(71) Applicant: Oracle International Corporation, Redwood Shores, CA (US)

(72) Inventors: Jared Michael Renzullo, Hudson, MA (US); Tarek Abou-Assali, Wellesley, MA (US)

(73) Assignee: Oracle International Corporation, Redwood Shores, CA (US)

( * ) Notice: Subject to any disclaimer, the term of this patent is extended or adjusted under 35 U.S.C. 154(b) by 73 days.

(21) Appl. No.: 14/735,072

(22) Filed: Jun. 9, 2015

(65) Prior Publication Data

US 2016/0366061 A1 Dec. 15, 2016

(51) Int. Cl.
*H04L 12/801* (2013.01)
*H04L 12/721* (2013.01)
*H04L 12/725* (2013.01)
*H04L 29/08* (2006.01)
*H04L 12/729* (2013.01)

(52) U.S. Cl.
CPC ........ *H04L 45/304* (2013.01); *H04L 67/1002* (2013.01); *H04L 45/125* (2013.01)

(58) Field of Classification Search
CPC ....... H04L 47/14; H04L 45/38; H04L 41/147; H04L 43/08; H04L 43/16; H04L 41/0681; H04L 45/304; H04L 67/1002; H04L 45/125
See application file for complete search history.

(56) References Cited

U.S. PATENT DOCUMENTS 8,468,267 B2 6/2013 Yigang et al.
8,601,073 B2 12/2013 Craig et al.
(Continued)

FOREIGN PATENT DOCUMENTS

KR 10-2009-0029348 3/2009
WO WO-2013/155535 A1 10/2013

OTHER PUBLICATIONS

Applicant-Initiated Interview Summary for U.S. Appl. No. 13/863,351 (May 27, 2016).
(Continued)

*Primary Examiner* — Chi H Pham
*Assistant Examiner* — Shailendra Kumar
(74) *Attorney, Agent, or Firm* — Jenkins, Wilson, Taylor & Hunt, P.A.

(57) ABSTRACT

The subject matter described herein includes methods, systems, and computer readable media for implementing intelligent PCRF overload control. A method may be performed at a Diameter Routing Agent (DRA) including at least one processor. The method includes receiving an indication of a first overload level for at least a first PCRF of a plurality of PCRFs and determining, from the first overload level, a first routing rule for routing message traffic to the first PCRF. The method further includes receiving message traffic requiring processing by the first PCRF and performing a first action specified by the first routing rule to accept the message traffic, reject the message traffic, or send a response on behalf of the first PCRF.

21 Claims, 7 Drawing Sheets

(56) References Cited

U.S. PATENT DOCUMENTS

| | | | |
|---|---|---|---|
| 8,879,431 | B2 | 11/2014 | Ridel et al. |
| 2003/0200277 | A1 | 10/2003 | Kim |
| 2009/0185494 | A1 | 7/2009 | Li et al. |
| 2009/0265467 | A1 | 10/2009 | Peles |
| 2011/0040845 | A1* | 2/2011 | Cai .................. H04L 47/10 709/206 |
| 2011/0061061 | A1* | 3/2011 | Chen ................ H04L 63/08 719/313 |
| 2011/0158090 | A1* | 6/2011 | Riley ............... H04L 12/14 370/230 |
| 2013/0041994 | A1* | 2/2013 | Terrien ............. H04L 43/16 709/223 |
| 2013/0275583 | A1 | 10/2013 | Roach et al. |
| 2013/0322327 | A1* | 12/2013 | Jorgensen ........ H04W 40/00 370/328 |
| 2014/0187199 | A1* | 7/2014 | Yan ................. H04W 48/02 455/410 |
| 2014/0376380 | A1 | 12/2014 | Campbell et al. |
| 2015/0236915 | A1* | 8/2015 | Mohammed ..... H04L 67/30 709/223 |
| 2016/0080578 | A1* | 3/2016 | Stenfelt ........... H04L 41/5025 455/406 |
| 2016/0112275 | A1* | 4/2016 | Park ................ H04L 41/147 709/224 |

OTHER PUBLICATIONS

Notice of Allowance for U.S. Appl. No. 14/313,610 (May 20, 2016).
Applicant-Initiated Interview Summary for U.S. Appl. No. 14/313,610 (Apr. 26, 2016).
Non-Final Office Action for U.S. Appl. No. 13/863,351 (Mar. 17, 2016).
Non-Final Office Action for U.S. Appl. No. 14/313,610 (Jan. 11, 2016).
Extended European Search Report for European Application No. 13776083.1 (Dec. 14, 2015).
Advisory Action for U.S. Appl. No. 13/863,351 (Nov. 25, 2015).
Commonly-assigned, co-pending U.S. Appl. No. 14/918,541 for "Methods, Systems, and Computer Readable Media Diverting Diameter Traffic From an Overload Policy and Charging Rules Function (PCRF)," (Unpublished, filed Oct. 20, 2015).
Final Office Action for U.S. Appl. No. 13/863,351 (Sep. 11, 2015).
Non-Final Office Action for U.S. Appl. No. 13/863,351 (Mar. 27, 2015).
Communication of European publication number and information on the application of Article 67(3) EPC for European Application No. 13776083.1 (Jan. 21, 2015).
Korhonen et al., "Diameter Overload Indication Conveyance draft-ietf-dime-ovli-06.txt," Diameter Maintenance and Extensions (DIME), https://tools.ietf.org/html/draft-ietf-dime-ovli-06, pp. 1-51 (Jan. 8, 2015).
Notification of Transmittal of the International Search Report and the Written Opinion of the International Searching Authority, or the Declaration for International Application No. PCT/US2013/036664 (Jul. 2, 2013).
Campbell, "Diameter Overload Control Solution Issues," draft-campbell-dime-overload-issues-00, pp. 1-16 (Jun. 2013).
Roach et al., "A Mechanism for Diameter Overload Control," draft-roach-dime-overload-ctrl-03, DIME, pp. 1-49 (May 17, 2013).
Korhonen et al., "The Diameter Overload Control Application (DOCA)," draft-korhonen-dime-ovl-01.txt, Diameter Maintenance and Extensions (DIME), pp. 1-18 (Feb. 25, 2013).
Fajardo et al., "Diameter Base Protocol," RFC 6733, pp. 1-152 (Oct. 2012).
McMurry et al., "Diameter Overload Control Requirements," draft-ietf-dime-overload-reqs-00, pp. 1-25 (Sep. 21, 2012).
"Multi-Protocol Routing Agent User's Guide," Policy Management, 910-6404-001 Revision A, Copyright 2012 Tekelec (Jun. 2012).
Calhoun et al., "Diameter Base Protocol," RFC 3588, pp. 1-147 (Sep. 2003).

* cited by examiner

300A — Level 1 (2 rules) — ACCEPT

| Name | App | Message | Action |
|---|---|---|---|
| DefaultRule1 | Gx | CCR | Answer with DIAMETER_UNABLE_TO_COMPLY |
| DefaultRule4 | Gxx | CCR | Answer with DIAMETER_UNABLE_TO_COMPLY |

302

304
▷ Level 2 (3 rules)
▷ Level 3 (5 rules)
▷ Level 4 (3 rules)

⇪ Export

FIG. 3B

300B
◉ Accept
○ Drop
○ Answer With [    ]
○ Answer With [    ] and Vendor ID [    ]
  Code Add▽ | Clone | Edit | ✕ Delete | ⇧ Up ⇩ Down

| Name | App | Message | Action |
|---|---|---|---|
| DefaultRule1 | Gx | CCR | Answer with DIAMETER_UNABLE_TO_COMPLY |
| DefaultRule4 | Gxx | CCR | Answer with DIAMETER_UNABLE_TO_COMPLY |

Edit Load Shedding Rule

*Name   [DefaultRule1]

312 {
Application   [Rx ▽]
Message       [AAR ▽]
              Any
Request Types CCR
☐ Initial     STR           rminate APNs          [____________](CSV)
}

314 {
Action
○ Accept
○ Drop
⦿ Answer With  [DIAMETER_UNABL ▽]
○ Answer With  [________] and Vendor ID [____]
  Code
}

[OK]  [Cancel]

METHODS, SYSTEMS, AND COMPUTER READABLE MEDIA FOR IMPLEMENTING INTELLIGENT POLICY AND CHARGING RULES FUNCTION (PCRF) OVERLOAD CONTROL

TECHNICAL FIELD

The subject matter described herein relates to routing traffic to one or more Policy and Charging Rules Functions (PCRFs). More particularly, the subject matter described herein relates to methods, systems, and computer readable media for implementing intelligent PCRF overload control.

BACKGROUND

Policy and Charging Rules Functions (PCRFs) are network nodes that perform policy and charging functions for a network. The PCRF function is invoked when another node establishes a policy and charging control session with the PCRF. For example, a Packet Data Network (PDN) Gateway (PGW) or other node may establish a session with a PCRF to either obtain policy and charging instructions for sessions involving a given end user or to authorize and set up policy and charging rules associated with a service.

A Diameter routing agent (DRA) assigns sessions to PCRFs and routes messages associated with a session to the PCRF to which the corresponding session has been assigned. Once a session is assigned to a PCRF, all traffic associated with that session is typically routed to the same PCRF until the session is terminated. However, it may be desirable to offload traffic and/or assign new sessions to alternate PCRFs to avoid overloading a PCRF.

Network operators typically deploy multiple PCRFs in a network and load share the assignment of new sessions among the PCRFs. New sessions can be assigned to PCRFs according to a preferential order, a prioritized list, a load balancing algorithm, a session utilization metric, or the like. At some point, one or more of the PCRFs may reach a maximum session capacity, for example, during a traffic burst, a traffic storm, situations where a large quantity of background tasks are running, etc., and reach an overloaded state. To date, all that is known about the load for any given PCRF is minimal information regarding whether or not its maximum session capacity has been met. This is problematic, as there is no indication regarding the actual degree of overload, for example, whether or not a given PCRF is only a little overloaded so that it may still be used to provide critical services, or whether the PCRF at its absolute maximum capacity so that all traffic to the overloaded PCRF should be eliminated.

Some existing systems fail to implement any type of overload control. Thus, the DRA continues to send traffic to an overloaded PCRF until the PCRF rejects the messages. The PCRF will reject any messages it cannot handle or throttle traffic for a particular Diameter application to the PCRF. This is problematic, as customer deployments with high transaction rates may lose access to critical services.

One conventional method of providing PCRF overload control includes piggybacking overload information within Diameter credit control answer (CCA) messages. This is problematic, as traffic to the overloaded PCRF cannot effectively be eliminated, as one or more Diameter Credit Control Requests (CCR) and subsequent Diameter CCA messages become necessary for the PCRF to indicate when it is no longer overloaded.

Accordingly, a need exists for methods, systems, and computer readable media for implementing intelligent PCRF overload control.

SUMMARY

The subject matter described herein includes methods, systems, and computer readable media for implementing intelligent Policy and Charging Rules Function (PCRF) overload control. An exemplary method for implementing intelligent PCRF overload control may be performed at a Diameter Routing Agent (DRA) including at least one processor. The method comprises receiving an indication of a first overload level for at least a first PCRF of a plurality of PCRFs and determining, from the first overload level, a first routing rule for routing message traffic to the first PCRF. The method further comprises receiving message traffic requiring processing by the first PCRF and performing a first action specified by the first routing rule to accept the message traffic, reject the message traffic, or send a response on behalf of the first PCRF.

A system for implementing intelligent PCRF overload control includes a DRA including at least one processor, wherein the DRA is configured to receive an indication of a first overload level for at least a first PCRF of a plurality of PCRFs and determine, from the first overload level, a first routing rule for routing traffic to the first PCRF. The system further comprises a routing engine configured to receive message traffic requiring processing by the first PCRF and route the message traffic according to a first action specified by the first routing rule. The DRA is configured to accept the message traffic, reject the message traffic, or send a response on behalf of the first PCRF.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

As used herein, the term "node" refers to a physical computing platform including one or more processors and memory.

As used herein, the terms "function" and "module" refer to software in combination with hardware and/or firmware for implementing features described herein.

BRIEF DESCRIPTION OF THE DRAWINGS

The subject matter described herein will now be explained with reference to the accompanying drawings of which:

FIG. 1 is a network diagram illustrating a Diameter Routing Agent (DRA) subscribing to receive overload information from Policy Charging and Rules Functions (PCRFs)

for implementing intelligent PCRF overload control according to an exemplary embodiment of the subject matter described herein;

DETAILED DESCRIPTION

The subject matter described herein relates to methods, systems, and special purpose computing systems executing computer readable media for implementing intelligent Policy and Charging Rules Function (PCRF) overload control. Rather than piggybacking overload information within answer messages to Credit Control Requests (CCRs) that are received at an overloaded PCRF, the overloaded PCRF may proactively share overload information in the form of a user-configured or user-defined "overload level" that indicates the degree of overload the respective PCRF is experiencing. The "overload level" may include a whole number integer adapted to indicate a level of overload experienced by a given PCRF, where "0" indicates no overload, and increasing numbers indicate increasing degrees of overload.

A special purpose computing system, such as a Diameter Routing Agent (DRA), may subscribe to one or more PCRFs for receiving notifications that include the overload information (e.g., overload levels), and process the overload information for improved (intelligent) routing, more efficient network utilization, and improved policy control. Rather than rejecting messages at an overloaded PCRF, methods, systems, and computer readable media herein may reject messages at the DRA on behalf of the PCRF, which reduces extraneous signaling within a network.

Notably, network operators may configure a plurality of overload control levels and/or actions for use in implementing intelligent PCRF overload control via a DRA, for example, by configuring the DRA to route policy messages (traffic) based upon one or more routing rules according to the level or degree of overload assigned to a given PCRF. This is advantageous, as the DRA has access to periodic overload information from each PCRF in a pool of PCRFs, which provides the DRA with intelligence to eliminate traffic to severely overloaded PCRFs, throttle traffic to moderately loaded PCRFs, and/or assign new sessions and/or offload existing traffic to minimally loaded PCRFs.

Figure 1:
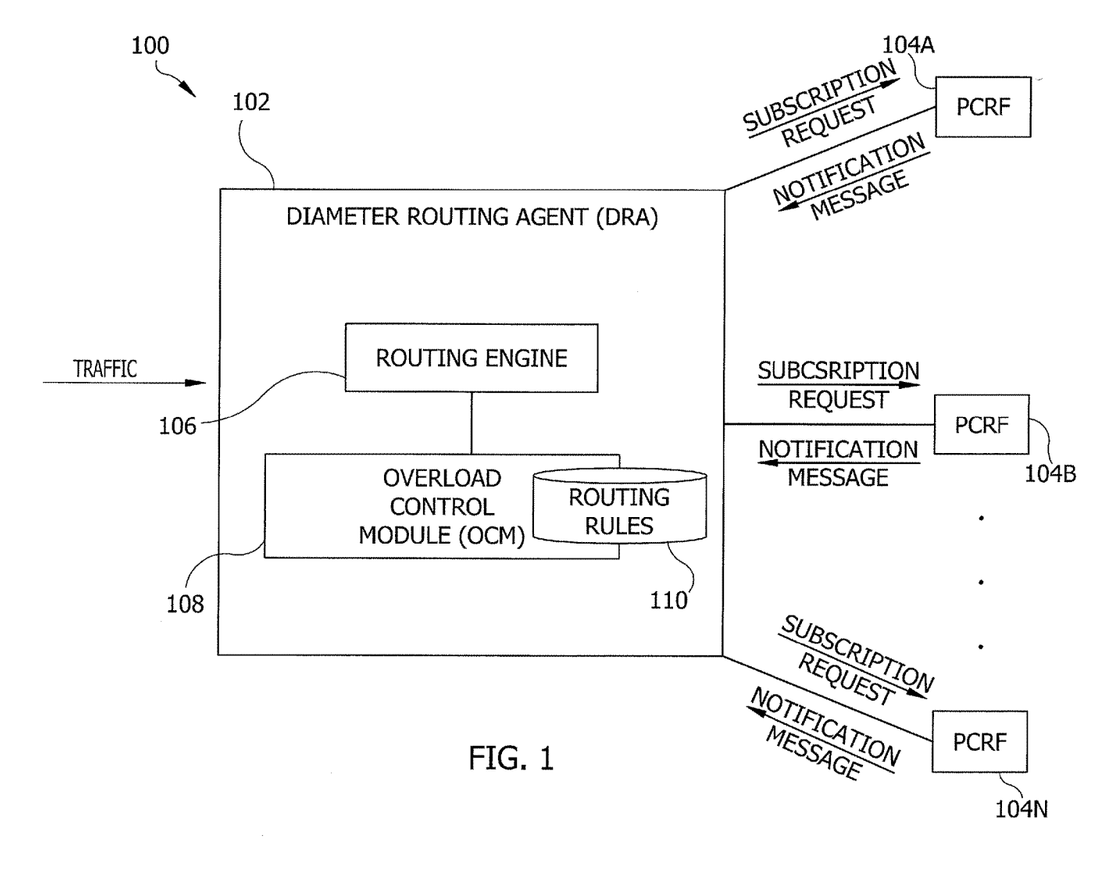

FIG. 1 is an exemplary network, generally designated 100. Network 100 includes a DRA 102 and a plurality of policy servers including PCRFs 104A, 104B to 104N, (where "N" is a whole number integer >2), sometimes referred to as a "pool" of PCRFs. DRA 102 is configured to receive new or existing policy message traffic, and assign the new message traffic to a PCRF and route the existing message traffic the PCRF assigned to that session. Policy message traffic originates from other nodes (not shown), such as PDN Gateways (PGWs), network enforcement nodes, access nodes, or the like. Other nodes (not shown) may send message traffic in the form of credit control requests (CCRs), credit control inquiries, AA-Requests (AARs), Rx Session-Termination-Request (STR) messages, Sh Push-Notification-Request (PNR) messages, Sy Status Notification Request (SNR) messages, the like for requesting policy and/or charging information for a subscriber from one PCRF of the pool of PCRFs (e.g., 104A to 104N).

PCRFs 104A to 104N include functionality for authorizing and making policy decisions in network 100 based on knowledge of subscriber resource usage and the capabilities allowed by the subscriber's account. PCRFs 104A to 104N are configured to authorize and make policy decisions including decisions relating to policy and charging, such as rules regarding a Quality of Service (QoS), an amount of bandwidth allocated for a given session and/or subscriber, an amount being charged for a given session, authorization to activate of application functionality, or the like. Policy parameters associated with subscriber traffic may be changed via one or more Policy Charging Control (PCC) rules that are generated by PCRFs 104A to 104N, and passed down to other nodes in network 100, such as policy decision points or enforcement nodes.

DRA 102 is configured to determine whether traffic is for a new session or an existing session. Where DRA 102 determines that the message traffic is for a new session, DRA 102 includes functionality for assigning new policy sessions to one of PCRFs 104A to 104N. In some embodiments, DRA 102 assigns new sessions according to a preferential order, a prioritized list, a load-balancing calculation, or any other suitable server assignment methodology. In other embodiments, DRA 102 makes assignment decisions regarding new sessions based upon routing rules filtering upon one or more overload levels communicated from PCRFs 104A to 104N. Where DRA 102 determines that the message traffic is for an existing session, DRA 102 may maintain the existing session by routing the policy traffic to the previously assigned PCRF. DRA 102 may also reject message traffic, offload message traffic, or automatically respond with a default or customized messaged on behalf of a PCRF 104A to 104N.

Still referring to FIG. 1, DRA 102 is configured to route message traffic to each of the plurality of PCRFs 104A to 104N via a routing engine 106. Routing engine 106 includes an overload control module (OCM) 108 configured to receive and process an overload level notification from PCRFs 104A to 104N, and determine routing actions based upon a lookup within and/or a filter applied to one or more routing rules 110. Routing rules 110 may be stored within a table, a database, a cache, a memory element, a storage device, or the like. Although routing rules 110 are illustrated as locally disposed at DRA 102, remote routing rules 110 may also be provided.

In some embodiments, OCM 108 includes functionality for receiving an indication of an overload level associated with each PCRF 104A to 104N, store the overload level, and access one or more routing rules 110 configured according to overload levels to determine whether a PCRF 104A to 104N is not overloaded, minimally overloaded, moderately overloaded, or severely overloaded. DRA 102 uses routing rules 110 to preemptively allow message traffic to be sent to a PCRF, reject message traffic, answer message traffic, and/or offload message traffic to another PCRF 104A to 104N depending upon an overload level communicated from each PCRF 104A to 104N. OCM 108 and routing rules 110 provide intelligence at DRA 102 for implementing smarter, more efficient PCRF allocation and utilization based upon one or more overload levels and routing rules that are configured using the one or more overload levels.

DRA 102 may be configured to access one or more routing rules 110 stored therein for implementing PCRF processing based on overload control. For example, routing rules may be configured (e.g., by a user or network operator) based upon one or more overload levels. Overload levels may include default levels that indicate a degree or level at which a PCRF 104A to 104N is overloaded. For simplicity purposes, overload levels include whole number integers, however, overload levels may also be defined according to a user or network operator preference.

In some embodiments an overload of "Level 0" may indicate that a respective PCRF is not overloaded in any respect. An overload of "Level 1" may indicate a minimally overloaded PCRF. An overload of "Level 2" may indicate a moderately overloaded PCRF. The greater the amount of overload, the greater the respective PCRF overload "Level". For example, an overload of "Level 3" may indicate a severely overloaded PCRF in which DRA 102 should eliminate all traffic. Overload levels are used to configure multiple routing rules 110, each of which include one or more "actions". DRA 102 is configured to implement intelligent overload control via performing the actions specified by routing rules 110. Overload levels may include one or more default levels and/or default rules that may be used and assigned by a user, subscriber, and/or network operator for defining a degree of overload and determining processing of message traffic. Routing rules 110 may be used and implemented by DRA 102 to allow, reject, answer, and/or offload traffic on behalf of a PCRF 104A to 104N, thereby implementing intelligent overload control.

Tables 1 and 2 include exemplary embodiments of routing rules 110 that may be stored at and/or accessed by DRA 102 for implementing intelligent overload control.

TABLE 1

| OVER-LOAD LEVEL | MESSAGE TYPE | ACTION |
|---|---|---|
| 0 | ANY | ALLOW |
| 1 | CCR-U | ALLOW |
| 1 | CCR-T | ALLOW |
| 1 | CCR-I | ANSWER WITH "DIAMETER_UNABLE_TO_COMPLY" |
| 2 | CCR-I | DROP |
| 2 | CCR-U | ALLOW |
| 2 | CCR-T | ALLOW |
| 3 | ANY | DROP |

As Table 1 illustrates above, one or more routing rules 110 can be configured to define an action to be taken by DRA 102 based upon an overload level and/or a message type. When a PCRF 104A to 104N is at a level 0, any type of message may be allowed to pass to a newly assigned and/or a previously assigned PCRF for processing. At level 1, CCR-Update (CCR-U) message traffic may be routed to the previously assigned PCRF 104A to 104N for processing. However, at level 1, CCR-Initial (CCR-I) messages may not be routed to a PCRF for processing, and instead DRA 102 may automatically answer the request with a default message of "DIAMETER_UNABLE_TO_COMPLY" on behalf of a PCRF. DRA 102 may assign the CCR-I message traffic to another, non-overloaded and/or minimally overloaded PCRF 104A to 104N. At level 1, CCR-Terminate (CCR-T) messages may be allowed to be processed by the assigned PCRF 104A to 104N.

As Table 1 above further illustrates, at an overload level of 2, CCR-I messages may be dropped (e.g., ignored and not processed). At an overload level of 2, CCR-U and CCR-T messages may be allowed. A user may also define and/or configure routing rules 110 (e.g., via a user interface, see FIGS. 3A to 3D) so that DRA 102 automatically answers requests on behalf of a PCRF. DRA 102 may automatically answer requests with a pre-defined result code/message or any custom result code/message or experimental result codes/messages. Routing rule 110 "Actions" may include options for allowing (e.g., accepting) the message for PCRF processing, dropping (e.g., ignoring) the message without replying, and/or answering the message either with a pre-defined (default) response or a custom response. Each "Action" may be performed by DRA 102 on behalf of a PCRF 104A to 104N.

Table 2 includes a further exemplary embodiment of routing rules 110 that may be stored at and accessed by DRA 102 for implementing intelligent overload control. In this embodiment, routing rules are defined based upon an overload level and application or interface type. Although Tables 1 and 2 are shown as separate routing rules 110, Tables 1 and 2 may also be combined so that actions are defined based upon a combination of the message and interface type (see e.g., FIGS. 3A to 3D).

TABLE 2

| OVER-LOAD LEVEL | ROUTING RULE | |
|---|---|---|
| | APP TYPE | ACTION |
| 0 | ANY | ALLOW |
| 1 | Gx | ALLOW |
| 1 | Gxx | ALLOW |
| 1 | Rx | ANSWER WITH "DIAMETER_UNABLE_TO_COMPLY" |
| 2 | Gx | DROP |
| 2 | Gxx | ANSWER WITH "DIAMETER_UNABLE_TO_COMPLY" |
| 2 | Rx | ANSWER WITH "DIAMETER_UNABLE_TO_COMPLY" |
| 2 | Sh | DROP |
| 2 | Sy | DROP |
| 3 | ANY | DROP |

As Table 2 illustrates above, one or more routing rules 110 can also be configured based upon the interface or application message type. When a PCRF 104A to 104N is at a level 0, any type of message traffic may be allowed to pass to a newly assigned and/or previously assigned PCRF for processing. At level 1, Gx message traffic may be passed to the previously assigned PCRF 104A to 104N for processing. However, at level 1, Gxx and Rx message traffic may not be allowed for processing, and instead DRA 102 may answer the request with a default message of "DIAMETER_UNABLE_TO_COMPLY" on behalf of the overloaded PCRF 104A to 104N. DRA 102 may assign the Gxx and/or Rx message traffic to another, non-overloaded or minimally overloaded PCRF 104A to 104N.

As Table 2 above further illustrates and at a level 2 overload, Sh and Sy application messages may be dropped (e.g., ignored and not processed). At a level 3 overload, all messages may be dropped or ignored and not processed, as the assigned PCRF 104A to 104N may be severely overloaded, for example, to the point that all traffic to that PCRF should be eliminated.

Tables 1 and 2 are exemplary and for illustration purposes only. As will be appreciated by persons having skill in the art, routing rules 110 may be configured according to any parameter and/or result in any action. Routing rules 110 may advantageously be customized and/or user configurable for more efficient utilization of network resources and/or more intelligent overload control. More than 3 levels of overload and routing rules 110 may also be provided, and/or any combination of message type, interface or application type, APN, and/or actions may be configured.

Still referring to FIG. 1, a user may also configure one or more routing rules 110 (e.g., via a user interface, see FIGS. 3A to 3D) based upon an Access Point Name (APN) including the name associated with an intermediate node (not shown, e.g., a gateway, PGW, or the like) that is trying to make a data connection with one of PCRFs 104A to 104N. DRA 102 includes functionality for examining the APN within message traffic for determining what action to take based upon routing rules 110. DRA 102 performs a lookup according to an overload level and/or an APN identifier to determine an action based upon the overload level and APN identifier. APNs may include a network identifier, an operator identifier (e.g., an operator's web address), a PDN identifier, a service identifier, or the like. DRA 102 will examine the APN to determine which APN message traffic should be allowed for processing, dropped (ignored) or answered on behalf of one or more PCRFs 104A to 104N.

As FIG. 1 illustrates, DRA 102 includes functionality for subscribing to receive overload levels (overload information) from each PCRF 104A to 104N. In response to a successful subscription, each PCRF 104A to 104N periodically publishes its overload level to OCM 108. Overload levels are stored in routing rules 110, and used for filtering or looking up rules to intelligently route message traffic for PCRF overload control. PCRFs 104A to 104N include functionality for reporting overload levels to DRA 102 via notification messages, either periodically, or in response to a perceptible change in an initial (pre-existing) overload level. For example, where an overload level increases or decreases, PCRFs 104A to 104N may be configured to notify DRA 102 of the new overload level. The new overload level is then stored within DRA 102 for improved routing and intelligent overload control.

It will be appreciated that FIG. 1 is for illustrative purposes and that various nodes, their locations, and/or their functionality described above in relation to FIG. 1 may be changed, altered, added, or removed. For example, some nodes and/or functionality thereof may be combined into a single entity, or separated into multiple entities.

Figure 2:
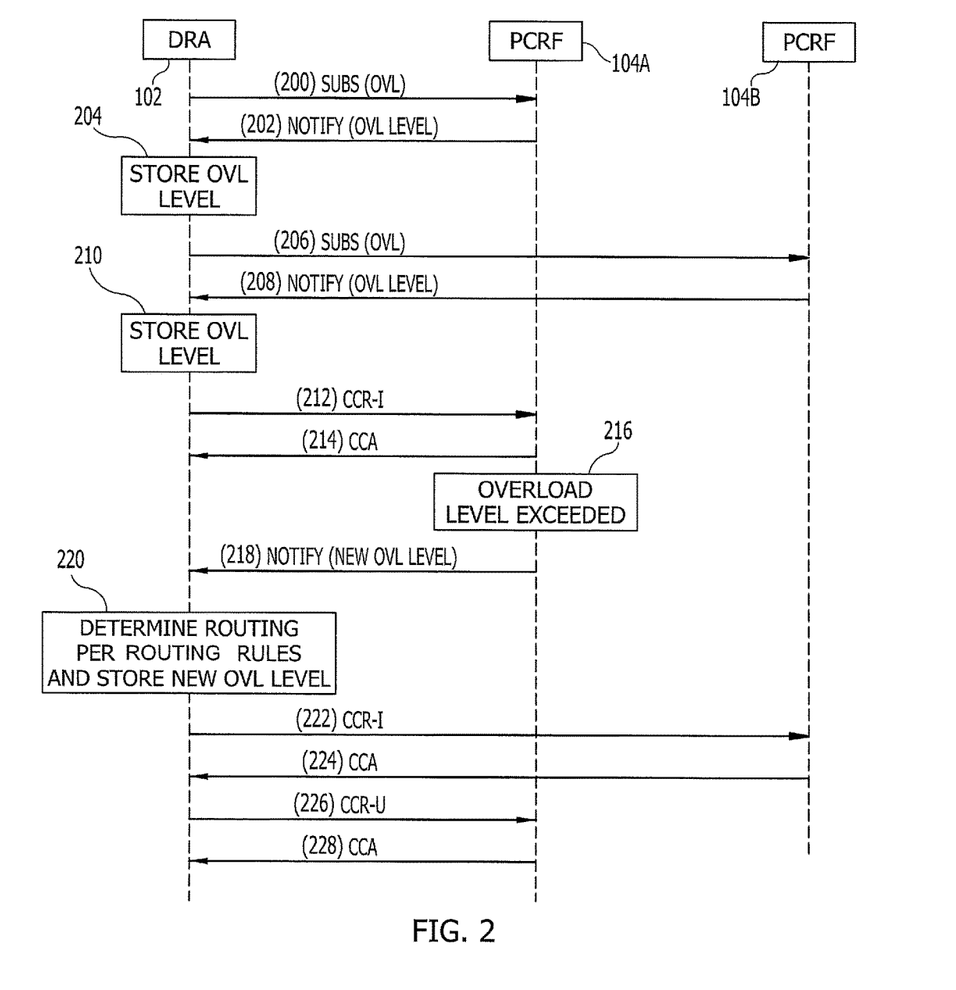
FIG. 2 is a message diagram illustrating exemplary messaging between a DRA and one or more PCRFs for implementing intelligent PCRF overload control according to an embodiment of the subject matter described herein.

FIG. 2 is a message diagram illustrating exemplary messaging between a DRA 102 and one or more PCRFs 104A and 104B for implementing intelligent PCRF overload control according to an embodiment of the subject matter described herein. At line 200, DRA 102 subscribes to a first PCRF 104A via a subscription request message. At line 202, the subscription is successful, and first PCRF 104A notifies DRA 102 of its overload (OVL) level. At block 204, DRA 102 stores the overload level communicated from first PCRF 104A.

At line 206, DRA 102 subscribes to a second PCRF 104B via a subscription request message. At line 208, the subscription is successful, and second PCRF 104B notifies DRA 102 of its overload (OVL) level. At block 210, DRA 102 stores the overload level communicated from second PCRF 104B.

DRA 102 includes functionality for subscribing to each PCRF of a plurality of PCRFs. DRA 102 may store a PCRF identifier (ID) for each respective PCRF and its respective overload level in a table for use in looking up one or more routing rules 110 (FIG. 1). Table 3 is an exemplary embodiment of overload information that may be stored at DRA 102 for use in intelligent routing and overload control. The information in Table 3 may be stored in addition to routing rules 110 (FIG. 1).

TABLE 3

| PCRF Identifier (ID) | OVERLOAD LEVEL |
|---|---|
| PCRF 1 | LEVEL 1 |
| PCRF 2 | LEVEL 2 |
| PCRF 3 | LEVEL 1 |
| PCRF 4 | LEVEL 0 |
| PCRF N | LEVEL 3 |

As Table 3 illustrates above, each PCRF includes a unique identifier (e.g., PCRF 1 to PCRF N, where N>4). DRA 102 is configured to receive an indication of the overload level associated with each PCRF, and store the information within a table, a database, a cache, a memory element, a storage device, or the like. Each overload level is associated with a rule (e.g., Tables 1 and 2). DRA 102 utilizes the overload level and/or a message type, an interface or application type, and/or an APN for determining an action in response to receiving message traffic.

In some embodiments, the overload level associated with a given PCRF (e.g., 104A, 104B) is assigned by a PCRF and/or a network operator according to a configurable value or limit. The overload level may include a whole number integer or any other figure representative of and/or indicative of a level or degree to which a given PCRF is overloaded. Each overload level may be associated with a message type, an interface or application type, and/or an APN (see e.g., Tables 1 and 2). The combination of a message parameter (e.g., a message type, an interface type, and/or an APN) and an action are used to define one or more routing rules 110 stored and accessed by DRA 102. Overload levels may then be used to filter routing rules 110 to determine a routing action. A first action specified by a first routing rule may include accepting or allowing the message traffic to proceed to PCRF for processing, rejecting (e.g., dropping or ignoring) the message traffic, and/or responding to message traffic on behalf of the first PCRF. In some aspects, a network operator may configure a plurality of routing rules, wherein each of the plurality of routing rules specifies an action based upon a message type, an interface or application type, and/or an APN.

Each PCRF (e.g., 104A, 104B) may be configured to compute an overload level and notify the subscribing DRA 102 as to its respective overload level. PCRFs 104A and 104B may be configured to notify DRA 102 upon perceptible changes in the respective overload level (e.g., increases or decreases) so that DRA 102 may update its information for providing improved, intelligent overload control.

Still referring to FIG. 2, and at line 212, DRA 102 forwards a CCR-I message to first PCRF 104A for processing. At line 214, first PCRF 104A responds with a Credit Control Answer (CCA) message.

At block 216, first PCRF 104A detects a change in overload level. For example, at block 216, first PCRF 104A may determine that the initially reported overload level is exceeded. At line 218, first PCRF 104A sends a notification message notifying DRA 102 of its new overload limit. DRA 102 is also configured to overwrite or update the initial overload level with the new information received from first PCRF 104A.

At block 220, DRA 102 receives message traffic and, using an OCM (e.g., 108, FIG. 1), determines routing per one or more routing rules (e.g., 110, FIG. 1). DRA 102 utilizes the overload level communicated from each PCRF in combination with any other parameter (e.g., a message type, an interface or application type, an APN, etc.) to determine an action to take in response to receiving message traffic. The action may include allowing the message traffic to be processed by a new or previously assigned PCRF, rejecting the traffic, or responding to the traffic with a default message. The routing rules (e.g., 110, FIG. 1) accessed by DRA 102 may indicate that message traffic for new sessions (e.g., CCR-I messages) should be routed to another PCRF, such as second PCRF 104B. Thus, at line 222, a message traffic for a new session CCR-I message may be routed to second PCRF 104B via a routing engine (e.g., 106, FIG. 1) of DRA 102. At line 224, second PCRF 104B responds with a CCA.

The routing rules (e.g., 110, FIG. 1) accessed by DRA 102 may indicate that message traffic for existing sessions (e.g., CCR-U messages) should be routed to a previously assigned PCRF. Thus, at line 226, DRA 102 routes a CCR-U message to first PCRF 104A for processing. At line 228, first PCRF 104A responds to the CCR-U message traffic with a CCA message. Thus, routing rules 110 (FIG. 1) may be used to allow some traffic to be processed by minimally and/or even moderately overloaded PCRFs, while other rules may eliminate all traffic to severely overloaded PCRFs. Intelligence (e.g., overload information and/or routing rules) is provided locally at DRA 102 for more efficient allocation of policy servers (e.g., PCRFs) and/or network resources.

It will be appreciated that FIG. 2 is for illustrative purposes and that various messaging requests, answers, responses and/or actions taken by DRA 102 may be changed, altered, added, or removed. For example, DRA 102 may route CCR-I, CCR-U, CCR-T, AAR, PNRs, SNRs, STRs, etc., differently according to different, user configurable or defined routing rules.

Figure 3A:
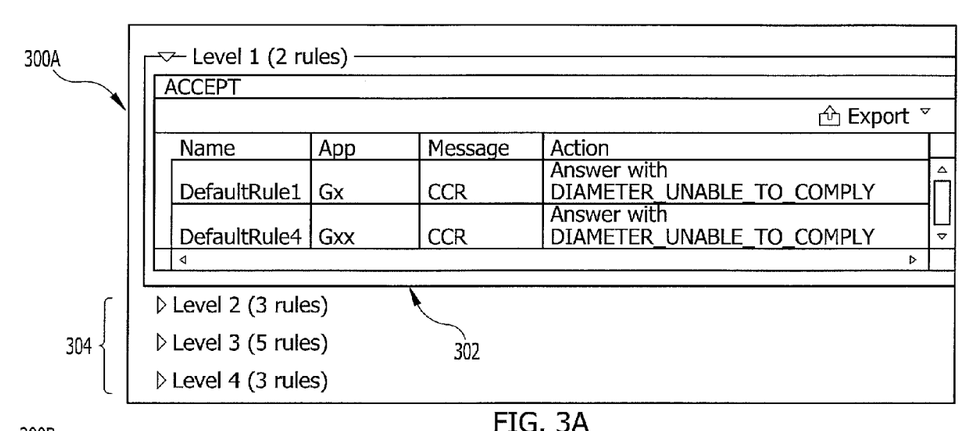
FIGS. 3A to 3D are line drawings of computer screenshots illustrating exemplary user interfaces for configuring rules for intelligent PCRF overload control according to an embodiment of the subject matter described herein.

FIGS. 3A to 3D are line drawings of computer screenshots illustrating exemplary user interfaces for configuring rules for intelligent PCRF overload control according to an embodiment of the subject matter described herein. FIG. 3A is a screenshot 300A illustrating a first rule 302 that is configured for a first level of overload, for example, a level 1 overload. First rule 302 may be stored within a table, database, a cache, a storage medium, or the like, of a DRA (FIG. 1) of multiple routing rules (e.g., 110, FIG. 1). The other rules in portion 304 of screenshot 300A are collapsed. First rule 302 may include a rule name and a rule defined by an application interface, a message type, and/or an action. As FIG. 3A illustrates, at overload level 1, at least two rules may be specified. For example, DRA 102 (FIG. 1) will respond to Gx and Gxx CCR message traffic on behalf of the assigned PCRF with a an automatic answer of "DIAMETER_UNABLE_TO_COMPLY". In other embodiments, first rule 302 includes a default rule configured for use by one or more network operators. Any combination of application interfaces, message type, and/or actions may be used to define one or more rules for use in routing and message processing, thereby providing for intelligent PCRF overload control.

Figure 3B:
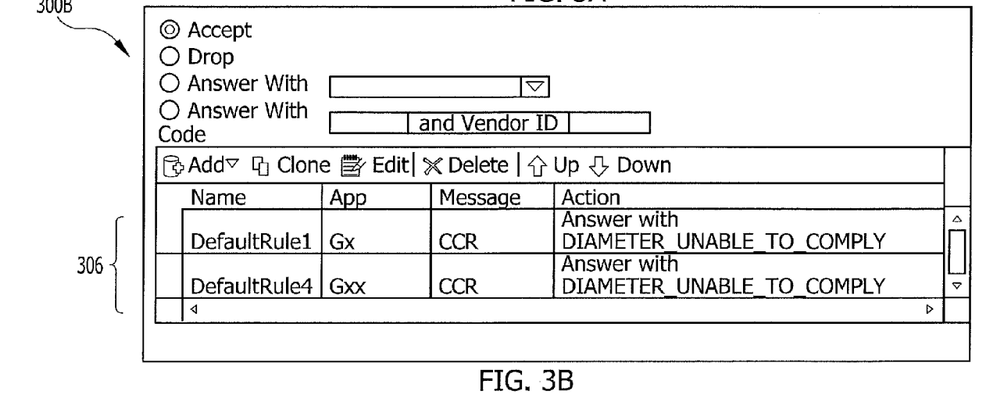

FIG. 3B illustrates a screenshot 300B of a user interface by which a user may select a default action for a level 1 overload, which will be applied to messages not matching a configured rule. That is, in section 306, a user may select a default action of answering with "DIAMETER_UNABLE_TO_COMPLY" in response to Gx and Gxx CCR messages. Section 306 is an example of a user selecting default actions for level 1 overload.

Figure 3C:
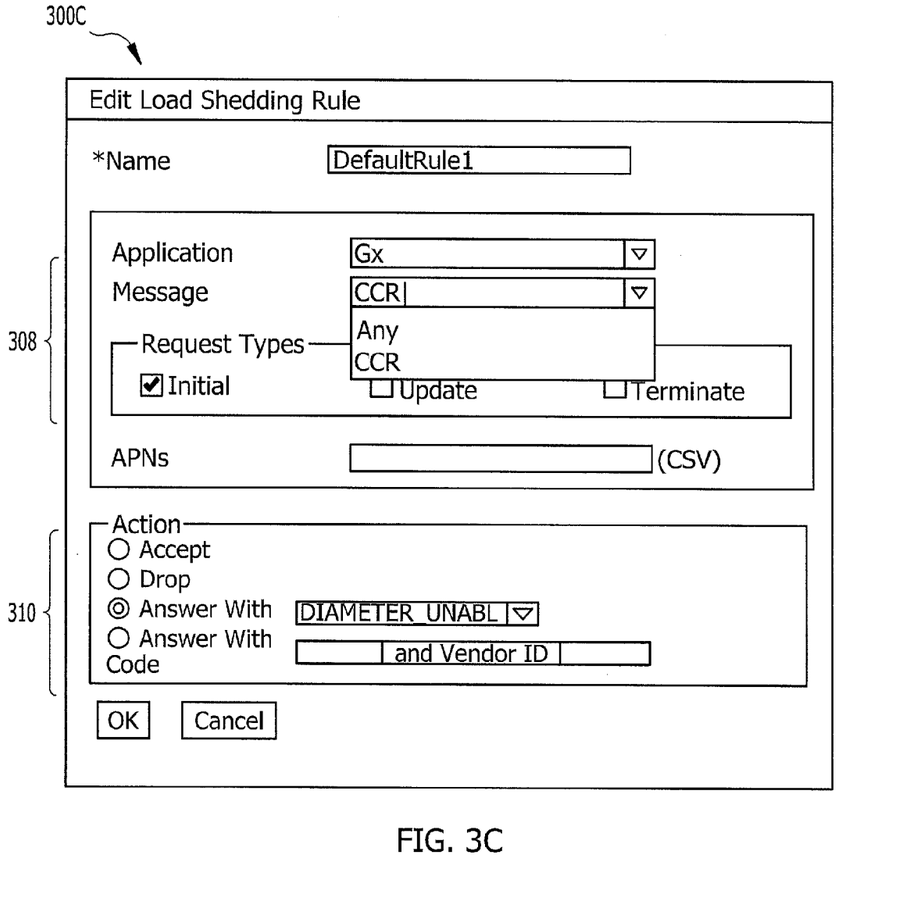

FIG. 3C is a screenshot 300C of a user interface by which a user may edit an overload rule. In FIG. 300C, a user may utilize one or ore dropdown boxes in portion 308 to configure Gx and CCR-I (Initial) as the only valid message type associated with a default rule. Other messages that may be configured into a rule include CCR-U, CCR-T, AAR, STR, SNR, PNR, and/or a list of APNs can also be defined. The user may also configure one or more actions associated with a rule for PCRF overload control, the rule being stored at and/or accessed by DRA (e.g., FIG. 1).

In some embodiments, a user specifies one or more actions in a second portion 310 of screenshot 300C. The actions associated with a user configurable routing rule may include "ACCEPT", meaning that the message traffic is allowed or admitted for processing, "DROP", meaning that the message traffic is ignored and DRA does not reply, "ANSWER WITH" a pre-defined message that can be selected via a drop-down box, or "ANSWER WITH" any customized "fill in the blank" style of option. Network operators may be presented with several options for implementing intelligent overload control via configuring a plurality of routing rules defining routing options that depend upon various degrees of overload, or overload levels. Notably, routing rules can be configured to filter on any criteria about a particular Diameter message (e.g. Diameter Application, Cmd Code, Called-Station-Id, CCR-Type, interface type, APN, etc.) or any combination of these criteria.

Figure 3D:
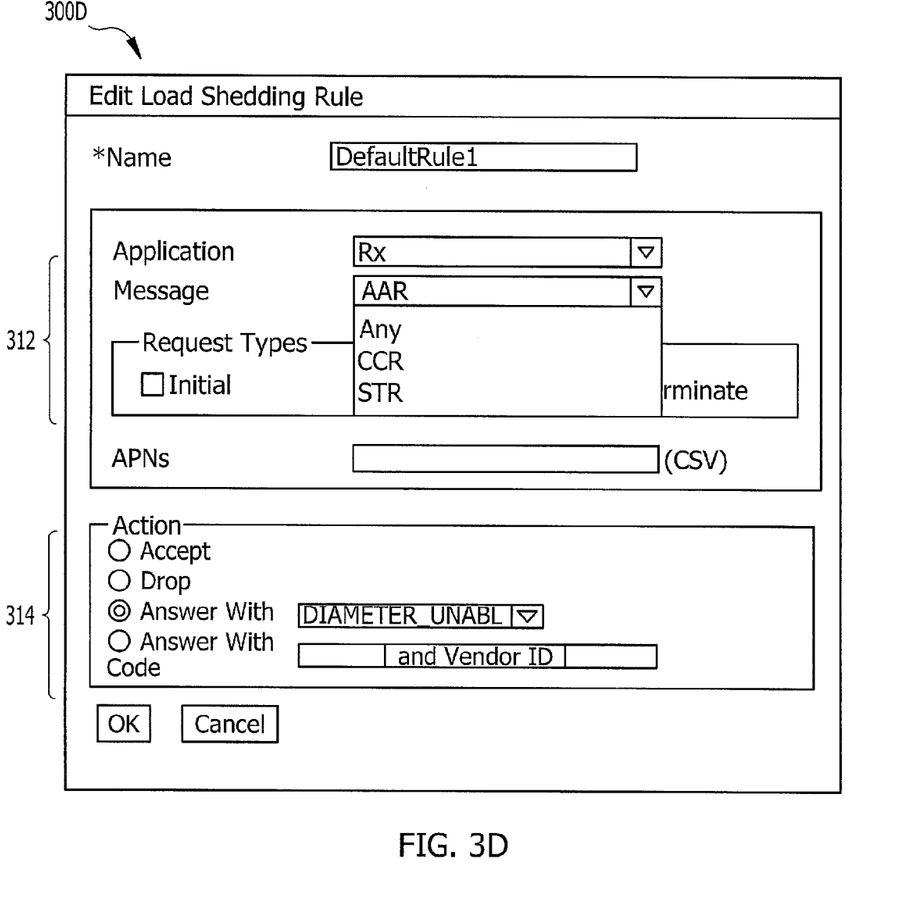

FIG. 3D is a screenshot 300D of another user interface by which a user may edit an overload rule. In this embodiment, a user is configuring a rule filtering on Rx applications and AAR messages in portion 312. The user can define am action in one portion 314 of user interface by enabling a DRA to respond or answer on behalf of a PCRF with the default message of "DIAMETER_UNABLE_TO_COMPLY" message code. Any rule, criteria, and/or action may be configured for improving routing via intelligent overload control according to the embodiments set forth herein.

Notably, FIGS. 3A to 3D illustrate screenshots by which a user may provide more intelligence at the DRA via user configurable routing rules. Where a PCRF cannot currently handle traffic, a message rejecting the traffic may be communicated from the DRA. Where a PCRF can handle traffic, the message traffic is forwarded to the PCRF until the PCRF notifies the DRA that a critical overload level has been met or reached, at which point DRA will eliminate all traffic to the overloaded PCRF.

Methods, systems, and computer readable media herein implement intelligent overload control by sharing information about the overload state of a PCRF (e.g., 104A to 104N, FIG. 1) with the DRA (e.g., 102, FIG. 1) through a subscribe/notify mechanism over a Diameter application. When the DRA (e.g., 102, FIG. 1) connects to a PCRF (e.g., 104A to 104N, FIG. 1), it may subscribe to receive overload information by sending a subscription request message to the PCRF. When the PCRF (e.g., 104A to 104N, FIG. 1) becomes overloaded, it may send a notification message to the DRA (e.g., 102, FIG. 1) indicating what overload level the PCRF is currently experiencing. This eliminates the need for piggybacking on existing CCA messages, as overload information can be shared independently of any other Diameter traffic. The overload level is a numerically increasing integer where "0" is interpreted as a PCRF being "not overloaded" and "1" is interpreted as a first, lowest overload level. The DRA (e.g., FIG. 1) may be configured with a set of rules (e.g., 110, FIG. 1) for handling traffic on behalf of an overloaded PCRF. These rules can dictate what action the DRA should take for specific Diameter messages received via specific interfaces at specific overload levels. Novel messaging herein enables the DRA (FIG. 1) to protect the PCRF (FIG. 1) while it is overloaded by allowing certain messages to continue to be processed when the PCRF is still able to do so.

Figure 4:
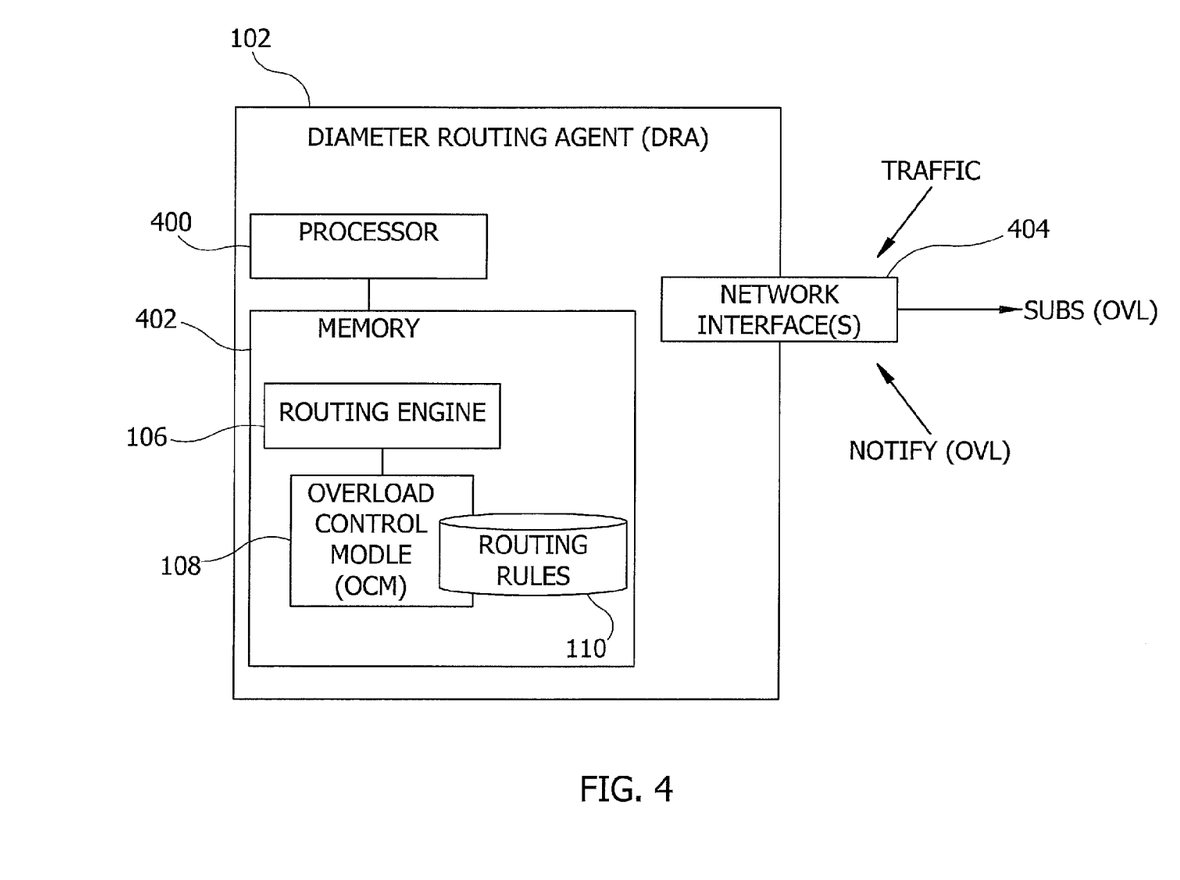
FIG. 4 is a block diagram illustrating a special purpose computer system comprising a DRA suitable to implement intelligent PCRF overload control according to an exemplary embodiment of the subject matter described herein.

FIG. 4 is a block diagram illustrating exemplary components of a special purpose computer system suitable for use in performing the functions described herein, namely intelligent PCRF overload control via DRA 102. In FIG. 4, DRA 102 includes at least one processor 400, at least one memory 402, and at least one network interface 404. Processor 400 may be a physical hardware processor including a single core or multiple cores. Processor 400 may also be a virtual processor that runs on a hypervisor layer that control access to underlying processor hardware.

Memory 402 may be volatile or non-volatile memory that stores instructions executed by processor 400. As with processor 400, memory 404 may be a physical memory chip or virtualized memory that is mapped to one or more physical memory chips by a hypervisor layer. Network interface 404 may be a physical or virtual interface for sending packets to and receiving packets from a network, within a network, and/or between network elements. In some embodiments, interface 404 is configured to send and receive overload control information. In other embodiments, interface 404 is configured to send and receive message traffic between DRA 102 and a PCRF (FIG. 1) and DRA 102 and additional nodes (e.g., PGW, etc.) communicating traffic requiring processing by a PCRF.

In the illustrated example, memory 402 stores a routing engine 106 and an OCM 108 having access to stored routing rules 110 based upon an overload level. Routing rules 110 are configured via OCM 108 and accessed by routing engine 106 for intelligent PCRF overload control. Routing engine 106 receives all messages and performs a lookup in routing rules 110 (e.g., a table, a data record, a cache, a database, etc.) to determine whether message traffic should be allowed, dropped, or answered on behalf of a PCRF. DRA 102 may also access routing rules 110 to determine server assignment, so that new sessions are assigned to the least overloaded PCRFs.

Routing engine 106 is configured to receive message traffic and utilize OCM 110 to determine how to process and/or route the message traffic. Routing engine 106 routes and/or processes message traffic as instructed by OCM 108 according to actions specified in a plurality of routing rules 110 stored therein. Routing engine 106 subscribes to PCRFs and receives notifications containing overload levels therefrom. Routing rules may be filtered according to an overload level, and any other parameter (e.g., message type, interface type, application type, APN, etc.), where desired.

It is understood that the architecture illustrated in FIG. 4 is exemplary and simplified in that a DRA 102 may include additional or alternative components without departing from the scope of the subject matter described herein. In one example, DRA 102 may be implemented on a processor blade in a rack-mounted system. Multiple DRA 102 processor blades may plug into a backplane to form a shelf. The DRA 102 processor blades may themselves operate in a stateful and redundant manner. In addition, DRA 102 may be a virtual server that runs on a hypervisor layer that shares access to underlying hardware, such as processor, memory, and network interfaces.

It will further be appreciated that FIG. 4 is for illustrative purposes and that various components, their locations, and/or their functions described above in relation to FIG. 4 may be changed, altered, added, and/or removed.

Figure 5:
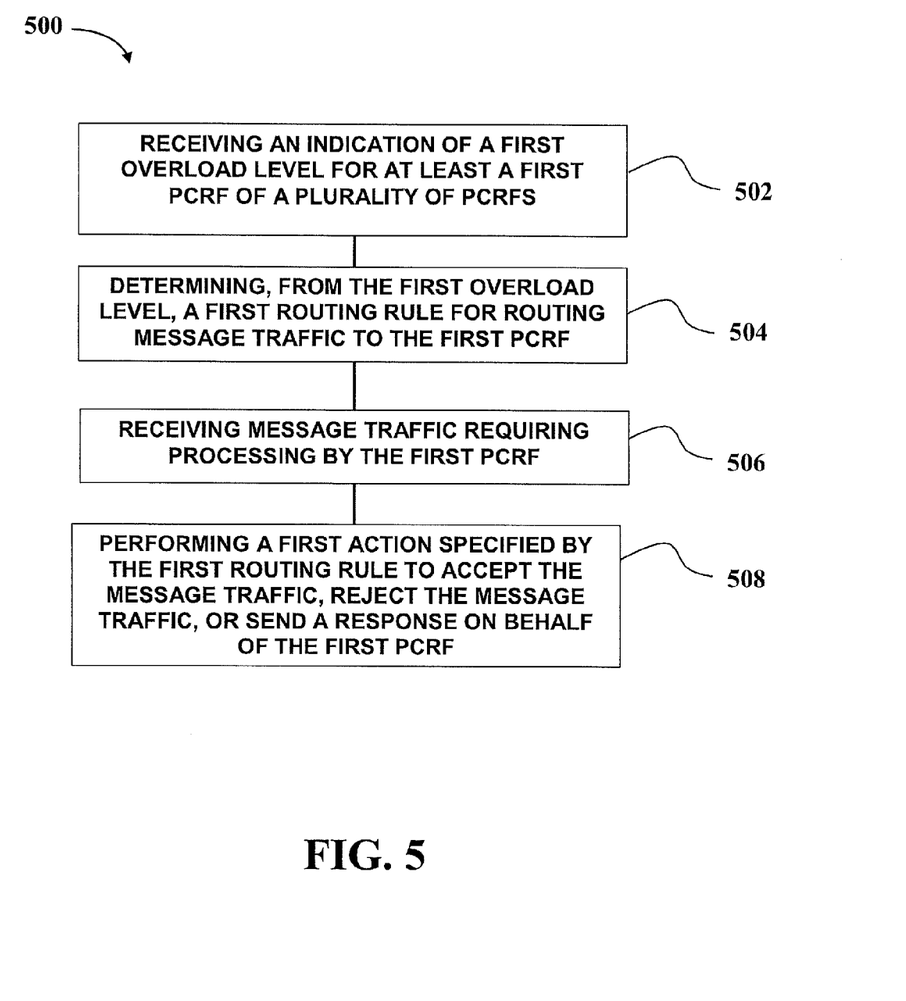
FIG. 5 is a flow chart illustrating an exemplary process for implementing intelligent PCRF overload control according to an exemplary embodiment of the subject matter described herein.

FIG. 5 is a flow chart illustrating an exemplary process for implementing intelligent PCRF overload control according to an exemplary embodiment of the subject matter described herein. Intelligent PCRF overload control may be performed at a special purpose computer system, such as a DRA (102, FIGS. 1 and 4) that includes at least one processor.

In block 502, a DRA receives an indication of a first overload level for at least a first PCRF of a plurality of PCRFs.

In block 504, a DRA determines, from the first overload level, a first routing rule for routing message traffic to the first PCRF.

In block 506, DRA receives message traffic requiring processing by the first PCRF.

In block 508, DRA performs a first action specified by the first routing rule to accept the message traffic, reject the message traffic, or send a response on behalf of the first PCRF.

Intelligent overload control as described herein functions on special purpose computing platforms, such as DRAs and PCRFs. The routing functionality and configurable overload levels described herein improve the functionality of messaging, server assignment, server allocation and/or policy server utilization within a network, as routing and processing packets between network components (e.g., DRA, PCRFs, etc.) and the core network in general is more intelligent, simplified, and less costly as the DRA can respond on behalf of one or more PCRFs.

Intelligent overload control as described herein improves the technological field of server assignment, server allocation, user defined networking via implementation of configurable routing rules, and routing of packets that require processing for policy and charging control. By implementing intelligent routing via routing rules, server utilization, allocation, and efficiency is also increased. Moreover, systems, methods, and computer readable media herein are configured to protect overloaded PCRFs, which is important in customer deployments with high transaction rates. The subject matter herein further maximizes service during overload, which reduces damage caused by receiving traffic higher than a PCRFs rated capacity.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for implementing intelligent Policy and Charging Rules Function (PCRF) overload control, the method comprising:
  at a Diameter Routing Agent (DRA) including at least one processor:
    receiving an indication of a first overload level for at least a first PCRF of a plurality of PCRFs;
    utilizing the indication of the first overload level received from the first PCRF to lookup a first routing rule stored locally on the DRA for routing message traffic to the first PCRF;
    receiving message traffic requiring processing by the first PCRF; and performing a first action specified by the first routing rule to accept the message traffic, reject the message traffic, or send a response on behalf of the first PCRF.

2. The method of claim 1, further comprising configuring a plurality of routing rules, wherein each of the plurality of routing rules specifies an action based upon a message type, an application type, or an Access Point Name (APN).

3. The method of claim 2, wherein the message type includes a Credit Control Request-Initiate (CCR-I) message, a CCR-Update (CCR-U) message, a CCR-Terminate (CCR-T) message, an AA-Request (AAR) message, a Rx Session-Termination-Request (STR) message, a Sh Push-Notification-Requests (PNR) message, or a Sy Status Notification Request (SNR) message.

4. The method of claim 2, wherein the application type includes a Gx message, a Gxx message, an Rx message, a Sh message, or a Sy message.

5. The method of claim 2, wherein the APN includes a network identifier, an operator identifier, an operator's web address, a Packet Data Network (PDN) identifier, or a service identifier.

6. The method of claim 1, further comprising storing the first routing rule in a memory of the DRA.

7. The method of claim 1, wherein the overload level includes a whole number integer used for looking up the first routing rule.

8. The method of claim 1, further comprising subscribing to each PCRF of the plurality of PCRFs.

9. The method of claim 8, further comprising receiving notifications from at least some of the plurality of PCRFs, and wherein the notifications include overload levels for the at least some of the PCRFs.

10. The method of claim 1, further comprising updating the first overload level in response to receiving a notification that the first overload level has changed.

11. A system for implementing intelligent Policy and Charging Rules Function (PCRF) overload control, the system comprising:
a Diameter Routing Agent (DRA) including at least one processor, wherein the DRA is configured to receive an indication of a first overload level for at least a first PCRF of a plurality of PCRFs and to utilize the indication of the first overload level received from the first PCRF to lookup a first routing rule stored locally on the DRA for routing traffic to the first PCRF;
a routing engine configured to receive message traffic requiring processing by the first PCRF and route the message traffic according to a first action specified by the first routing rule;
wherein the DRA accepts the message traffic, rejects the message traffic, or sends a response on behalf of the first PCRF.

12. The system of claim 11, wherein the DRA is configured with a plurality of routing rules, and wherein each of the plurality of routing rules specifies an action based upon a message type, an application type, or an Access Point Name (APN).

13. The system of claim 12, wherein the message type includes a Credit Control Request-Initiate (CCR-I) message, a CCR-Update (CCR-U) message, a CCR-Terminate (CCR-T) message, an AA-Request (AAR) message, a Rx Session-Termination-Request (STR) message, a Sh Push-Notification-Request (PNR) message, or a Sy Status Notification Request (SNR) message.

14. The system of claim 12, wherein the application type includes a Gx message, a Gxx message, an Rx message, a Sh message, or a Sy message.

15. The system of claim 12, wherein the APN includes a network identifier, an operator identifier, an operator's web address, a Packet Data Network (PDN) identifier, or a service identifier.

16. The system of claim 11, wherein the first routing rule is stored in a memory of the DRA.

17. The system of claim 11, wherein the overload level includes a whole number integer used for looking up the first routing rule.

18. The system of claim 11, wherein the DRA subscribes to each PCRF of the plurality of PCRFs.

19. The system of claim 18, wherein the DRA is configured to receive notifications from at least some of the plurality of PCRFs, and wherein the notifications include overload levels for the at least some of the PCRFs.

20. The system of claim 11, wherein the first overload level is updated in response to receiving a notification that the first overload level has changed.

21. A non-transitory computer readable medium having stored thereon executable instructions that when executed by the processor of a computer control the computer to perform steps comprising:
receiving an indication of a first overload level for at least a first PCRF of a plurality of PCRFs;
utilizing the indication of the first overload level received from the first PCRF to lookup a first routing rule stored locally on the DRA for routing traffic to the first PCRF;
receiving message traffic requiring processing by the first PCRF; and
performing a first action specified by the first routing rule to either accept the message traffic or reject the message traffic on behalf of the first PCRF.

* * * * *

UNITED STATES PATENT AND TRADEMARK OFFICE
CERTIFICATE OF CORRECTION

| | | |
|---|---|---|
| PATENT NO. | : 9,699,076 B2 | Page 1 of 1 |
| APPLICATION NO. | : 14/735072 | |
| DATED | : July 4, 2017 | |
| INVENTOR(S) | : Renzullo et al. | |

It is certified that error appears in the above-identified patent and that said Letters Patent is hereby corrected as shown below:

On the Title Page

On page 2, Column 2, under Other Publications, Line 6, delete "Overload" and insert -- Overloaded --, therefor.

In the Drawings

On sheet 1 of 7, in FIG. 1, Line 6, delete "SUBCSRIPTION" and insert -- SUBSCRIPTION --, therefor.

On sheet 6 of 7, in FIG. 4, Line 3, under Reference Numeral 108, Delete "MODLE" and insert -- MODULE --, therefor.

In the Specification

In Column 9, Line 57, delete "a an" and insert -- an --, therefor.

In Column 10, Line 8, delete "ore" and insert -- more --, therefor.

Signed and Sealed this
Third Day of April, 2018

Andrei Iancu
*Director of the United States Patent and Trademark Office*